Sept. 25, 1962     A. V. MACKEY     3,055,212
WIND TUNNEL
Filed Jan. 14, 1960
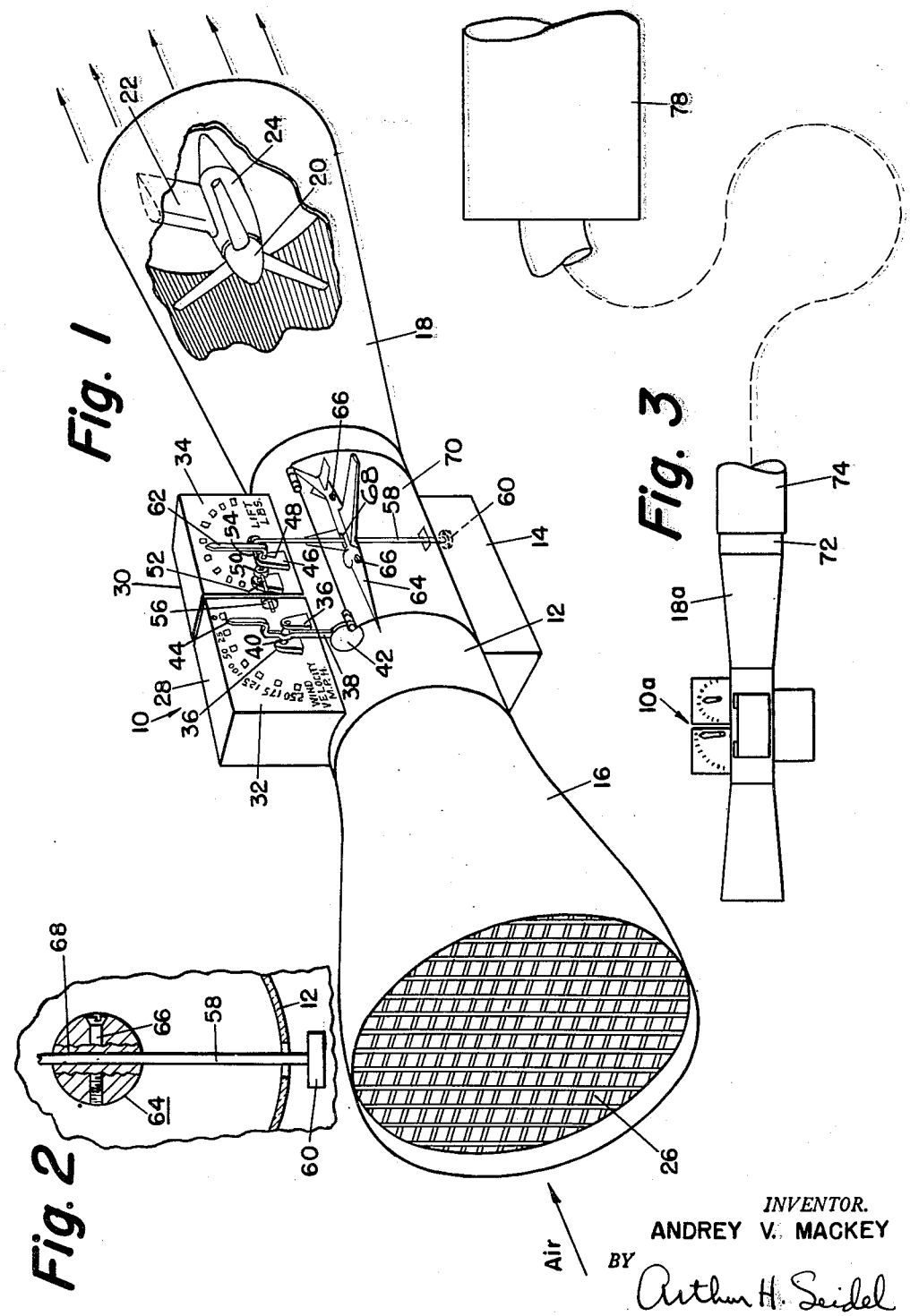
INVENTOR.
ANDREY V. MACKEY
BY
Arthur H. Seidel
ATTORNEY

United States Patent Office 3,055,212
Patented Sept. 25, 1962

3,055,212
WIND TUNNEL
Andrey V. Mackey, Ambler, Pa., assignor to H.M.S. Associates, Inc., Willow Grove, Pa., a corporation of Pennsylvania
Filed Jan. 14, 1960, Ser. No. 2,543
2 Claims. (Cl. 73—147)

The present invention relates to a wind tunnel, and more particularly to a model wind tunnel which can be operated by a child.

Children today are greatly interested in air and space travel. Such interest lies not only in reading about it, but many children are even interested in the actual construction and operation of airplanes and other modern aircraft. Thus, there has been an increasing interest among children in the building of model airplanes and other aircraft both of the non-flying and the flying types.

An instrument of major importance in the actual designing of aircraft is the wind tunnel. It would be desirable to have a model wind tunnel which can be operated by a child for testing model aircraft. Such a model wind tunnel would not only be an amusing toy, but would also be educational in teaching a child how an aircraft operates.

It is an object of the present invention to provide a model wind tunnel.

It is another object of the present invention to provide a model wind tunnel having instruments which simulate an actual wind tunnel.

A further object of the present invention is to provide a model wind tunnel which can be operated by a child for testing model aircraft.

Other objects will appear hereinafter.

For the purpose of illustrating the invention there is shown in the drawings forms which are presently preferred, it being understood, however, that this invention is not limited to the precise arrangements and instrumentalities shown.

FIGURE 1 is a perspective view, partly brokena way, of a model wind tunnel of the present invention.

FIGURE 2 is a sectional view through a portion of the wind tunnel of the present invention.

FIGURE 3 is a side elevational view of a modification of the wind tunnel of the present invention.

Referring initially to FIGURE 1, the wind tunnel of the present invention is generally designated as 10.

Wind tunnel 10 comprises a hollow, cylindrical center section 12 of a transparent plastic material. The center section 12 extends horizontally, and is supported on a base 14. A hollow, frustoconical front end section 16 of a plastic material is secured at its smaller diameter end to the front end of the center section 12. A hollow, frustoconical back end section 18 of a plastic material is secured at its smaller diameter end to the back end of the center section 12. The end sections 16 and 18 and the center section 12 of the wind tunnel 10 are in alignment so as to form a Venturi with the center section 12 being the throat of the venturi.

A fan 20 is disposed within the back end section 18 at the larger diameter end of the back end section 18. The fan 20 is supported from the wall of the back end section 18 by a post 22. The fan 20 is driven by an electric motor 24 which is also supported on the post 22. The electric motor 24 is preferably a variable speed motor. Although the motor 24 is shown as being supported on the post 22 with the fan 20, the motor 24 may be mounted separate from the fan 20, and drivingly connected to the fan 20 by an endless belt or the like. The motor 24 may be operated either by a standard 60 cycle 110 volt current, or by batteries. The motor 24 drives the fan 20 so that the fan 20 draws air through the wind tunnel 10 from the open end of the front end section 16 as indicated by the arrows in FIGURE 1. The front end section 16 may be provided with a grill 26 extending across the larger diameter open end of the front end section 16. Grill 26 is to deflect the air entering the front end section 16 to obtain a uniform flow of air across the entire area of the front end section 16.

A pair of hollow, rectangular housings 28 and 30 are mounted in side-by-side relation on the top of the center section 12 of the wind tunnel 10. The housings 28 and 30 are made of a plastic material with at least the front walls 32 and 34 of the housings 28 and 30 respectively being of a transparent plastic. A pair of bearing posts 36 are mounted within the housing 28. A vertically extending rod 38 is within the housing, and is rotatably mounted between the bearing posts 36 by trunnions 40. The rod 38 extends downwardly through elongated slots in the bottom of the housing 28 and the wall of the center section 12 of the wind tunnel 10 into the center section 12. A flat circular disc 42 is secured to the bottom end of the rod 38 with the flat surfaces of the disc 42 facing the open ends of the end sections 16 and 18. Thus, the front flat surface of the disc 42 is in the path of the flow of air through the wind tunnel 10 so that the air will engage the disc 42 and cause the arm 38 to pivot a distance in accordance with the speed of the air flowing through the center section 12. The rod 38 is provided with a pointer 44 extending upwardly from the upper end of the rod 38 adjacent the front wall 32 of the housing 28. The front wall 32 of the housing 38 is provided with indicia arranged in an arcuate path to indicate the speed of the flow of air through the center section 12.

A pair of bearing posts 46 are mounted in the housing 30. A shaft 48 extends through and is rotatably mounted in the bearing posts 46. A collar 50 is secured to the shaft 48 between the bearing posts 46. A pair of arms 52 and 54 extend from diametrically opposite sides of the collar 50 substantially perpendicular to the shaft 48. A weight 56 is threaded on the free end of the arm 52. A vertical rod 58 is pivotally mounted from the free end of the arm 54. The rod 58 extends downwardly across the center section 12 of the wind tunnel 10, and into the base 14. A small weight 60 is secured to the bottom end of the rod 58 within the base 14 to maintain the rod 58 vertical. A pointer 62 extends upwardly from the end of the shaft 48 adjacent the front wall 44 of the housing 30. The front wall 34 of the housing 30 is provided with indicia to indicate the movement of the pointer 62.

A model airplane 64 is mounted on the rod 58 within the central section 12 of the wind tunnel 10 with the nose of the airplane 64 facing the front end section 16 of the wind tunnel 10. The model airplane 64 is divided longitudinally into two halves which are secured together by screws 66. The model airplane 64 has a vertical hole 68 therethrough along the dividing line between the halves of the airplane 64. The hole 68 is elongated longitudinally along the airplane 64, and is of a width slightly less than the diameter of the rod 58. The airplane 64 is mounted on the rod 58 by placing the two halves of the airplane 64 around the rod 58 with the rod 58 extending through the hole 68. The screws 66 are then inserted and threaded in to clamp the halves of the airplane 64 around the rod 58. The center section 12 of the wind tunnel 10 has a hingedly mounted door 70 to permit access into the center section 12 to mount the airplane 64 on the rod 58.

In the use of the wind tunnel 10 of the present invention, the airplane 64 is mounted on the rod 58 in the manner as previously described. The weight 56 is threaded along the arm 52 until the weight 56 balances the combined weight of the rod 58, the weight 60, and the airplane 64. This is indicated by the pointer 62 which will be vertical. The motor 24 is then turned on to rotate the fan 20, and thereby provide a flow of air through the wind tunnel 10. The air passing through the center section 12 of the wind tunnel 10 engages the disc 42, and thereby rotates the rod 38 and the pointer 44 a distance in accordance with the velocity of the flow of air. The pointer 44 will indicate the velocity of the air on the front wall 32 of the housing 28.

The flow of air passing over the airplane 64 will cause the airplane 64 to move vertically. The vertical movement of the airplane 64 will also move the rod 58 vertically, and thereby rotate the shaft 48. The amount and direction of the vertical movement of the airplane 64 will be indicated on the front wall 34 of the housing 30 by the pointer 62. By varying the speed of the fan 20 to vary the velocity of the flow of air through the wind tunnel 10, the magnitude of the vertical movement of the airplane 64 can be varied. The angle of attack between the flow of air and the airplane 64 can be varied by loosening the screws 66, tilting the airplane 64 with respect to the rod 58, and then tightening the screws 66 again to secure the airplane 64 on the rod 58 at the desired angle.

The various instruments and operations of the wind tunnel 10 of the present invention provide an amusing toy for a child. In addition, the wind tunnel 10 of the present invention is an educational toy in that it teaches the effect of a flow of air over an airplane at various velocities of the air, and at various angles of attack between the flow of air and the airplane. Also, the wind tunnel 10 of the present invention can be provided with various designs of the airplane 64 to show the effect of design on the operation of the airplane. Since the airplane 64 can be completely removed from the rod 58, a child can design and build his own model airplanes, and test them in the wind tunnel 10.

Referring to FIGURE 3, a modification of the wind tunnel of the present invention is generally designated as 10a. Wind tunnel 10a is identical to the wind tunnel 10 shown in FIGURE 1 except that instead of the motor 24 and fan 20 for providing a flow of air through the wind tunnel, the back section 18a of the wind tunnel 10a is provided with an adaptor 72 to which can be connected the hose 74 of a vacuum cleaner 78. Thus, by operating the vacuum cleaner 78, a flow of air will be provided through the wind tunnel 10a.

The present invention may be embodied in other specific forms without departing from the spirit or essential attributes thereof and, accordingly, reference should be made to the appended claims, rather than to the foregoing specification as indicating the scope of the invention.

I claim:

1. A model wind tunnel comprising a hollow cylindrical central section, a hollow frustoconical front end section having its smaller diameter end secured to one end of the central section, a hollow frustoconical back end section having its smaller diameter end secured to the other end of said central section, a rod extending vertically across the central section, means supporting only the upper end of said rod to permit vertical movement of said rod, said rod supporting means including means for indicating the magnitude and direction of vertical movement of said rod, means on said rod for maintaining said rod vertical, a model airplane within said central section and mounted on said rod intermediate the ends of said rod, a weight secured to the lower end of said rod to maintain said rod in a vertical position, said model airplane being divided longitudinally into two sections and having a vertical hole therethrough at the dividing line between the sections, and screws extending through and securing the sections of the airplane together with the rod extending through the hole and the sections clamped tightly against the rod.

2. A wind tunnel in accordance with claim 1 in which the hole through the model airplane is elongated longitudinally of the airplane to permit varying the angle of the airplane with respect to the rod.

References Cited in the file of this patent

UNITED STATES PATENTS

| | | |
|---|---|---|
| 1,404,920 | Zahm | Jan. 31, 1922 |
| 2,065,496 | Adams | Dec. 29, 1936 |
| 2,331,304 | Carmody | Oct. 12, 1943 |
| 2,358,931 | Kahlow | Sept. 26, 1944 |
| 2,380,516 | Goldberg | July 31, 1945 |